United States Patent [19]
Delpuech et al.

[11] Patent Number: 5,596,142
[45] Date of Patent: Jan. 21, 1997

[54] WELL LOGGING APPARATUS COMPRISING A MEASURING PAD AND A COMBINATON DEVICE INCLUDING SUCH APPARATUS

[75] Inventors: Alain G. M. Delpuech, Le Plessis Robinson; David C. Hoyle, Saint-Cloud; Alan J. Sallwasser, Chatenay Malabry; Bronislaw Seeman, Paris, all of France

[73] Assignee: Schlumberger Technology Corporation, New York, N.Y.

[21] Appl. No.: 593,190

[22] Filed: Jan. 29, 1996

Related U.S. Application Data

[63] Continuation of Ser. No. 316,267, Sep. 30, 1994.

[30] Foreign Application Priority Data

Oct. 6, 1993 [FR] France ................... 93 11895

[51] Int. Cl.$^6$ .............. G01V 3/20; E21B 47/00; E21B 49/00
[52] U.S. Cl. .............. 73/152.17; 324/367; 324/374
[58] Field of Search .............. 73/151, 152; 324/367, 324/374; 166/250

[56] References Cited

U.S. PATENT DOCUMENTS

| | | | |
|---|---|---|---|
| 3,356,146 | 12/1967 | Anderson | 166/241 |
| 3,654,470 | 4/1972 | Wilson | 250/83.6 W |
| 3,990,297 | 11/1976 | Pelet et al. | 73/152 |
| 4,120,353 | 10/1978 | Roesner | 166/65 R |
| 4,130,816 | 12/1978 | Vogel et al. | 340/15.5 BH |
| 4,416,151 | 11/1983 | Ullo | 73/152 |
| 4,432,143 | 2/1984 | Moriarty et al. | 33/178 F |
| 4,541,275 | 9/1985 | Kerzner | 73/152 |
| 4,545,242 | 10/1985 | Chan | 73/152 |
| 4,588,951 | 5/1986 | Ohmer | 324/367 |
| 4,909,075 | 3/1990 | Flaum et al. | 73/152 |
| 4,958,073 | 9/1990 | Becker et al. | 250/269 |
| 5,036,283 | 7/1991 | Trouiller et al. | 324/375 |
| 5,198,770 | 3/1993 | Decorps et al. | 324/367 |
| 5,212,354 | 5/1993 | Miller | 181/108 |

FOREIGN PATENT DOCUMENTS 93 04229  4/1993  France.

*Primary Examiner*—Hezron E. Williams
*Assistant Examiner*—J. David Wiggins
*Attorney, Agent, or Firm*—Martin D. Hyden; Brigitte L. Jeffery

[57] ABSTRACT

A well logging apparatus adapted to be moved inside a borehole includes an elongate body, a measuring pad adapted to contact the wall of the borehole, a support device for the pad mounted pivotally on one side of the body, and a counter arm which causes the pad to be applied against the wall of the borehole. The support device includes an arm which carries the weight of the pad and is connected to the pad substantially in the central part thereof.

20 Claims, 5 Drawing Sheets

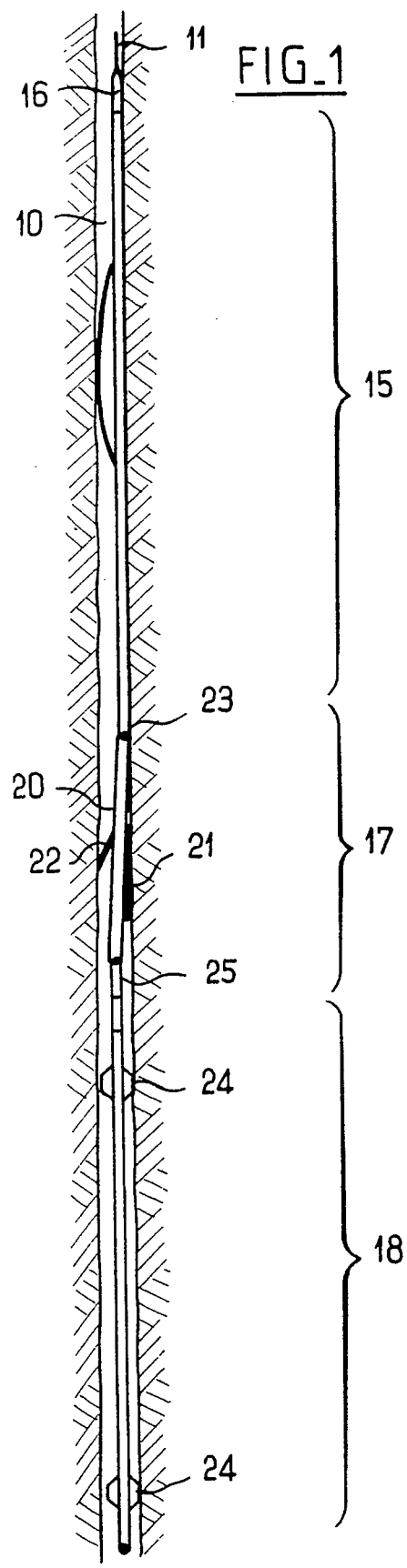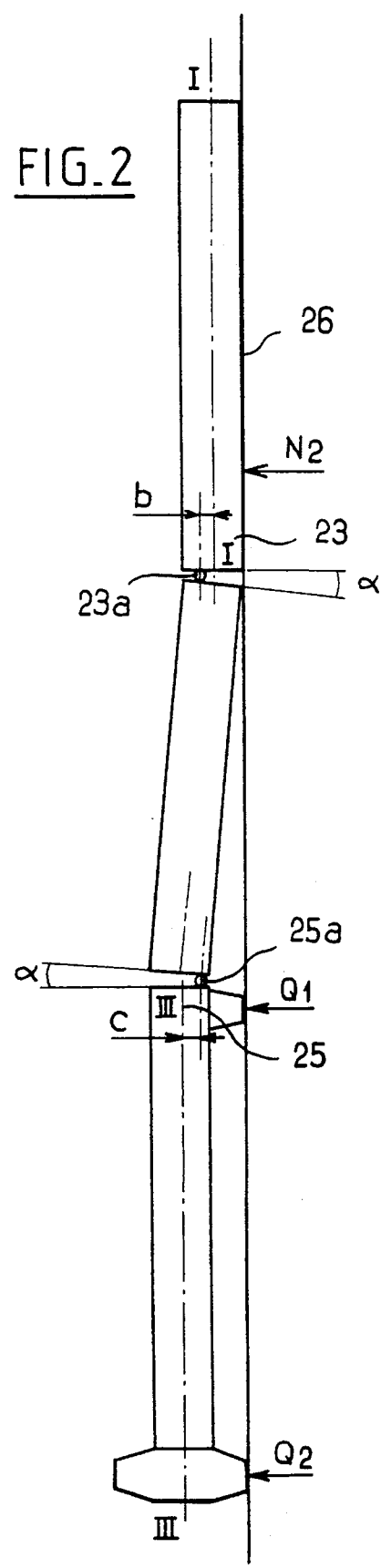

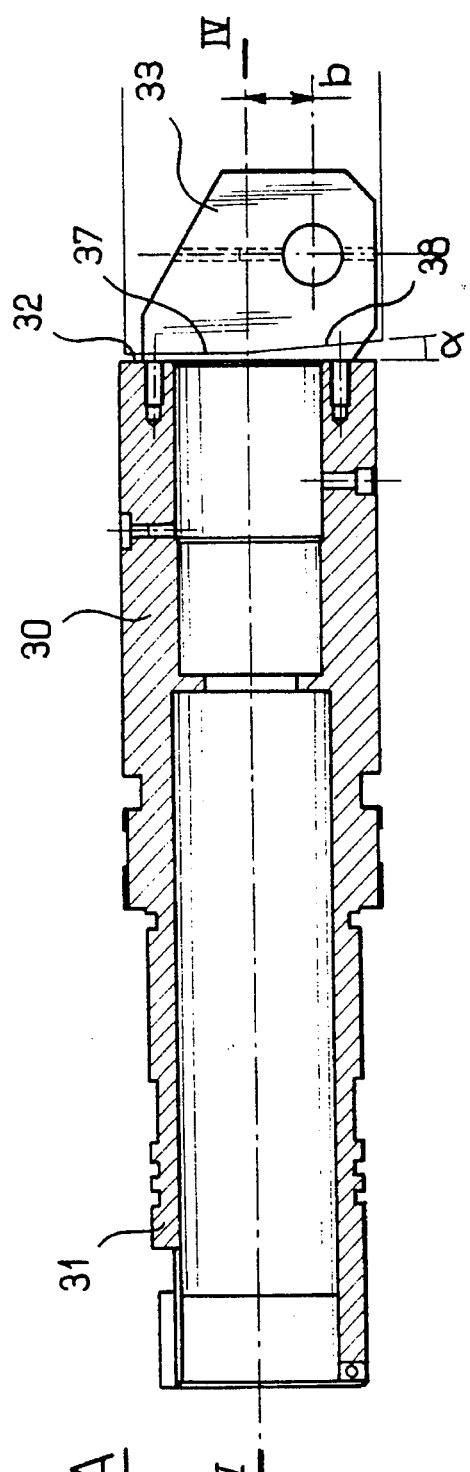
FIG_3A
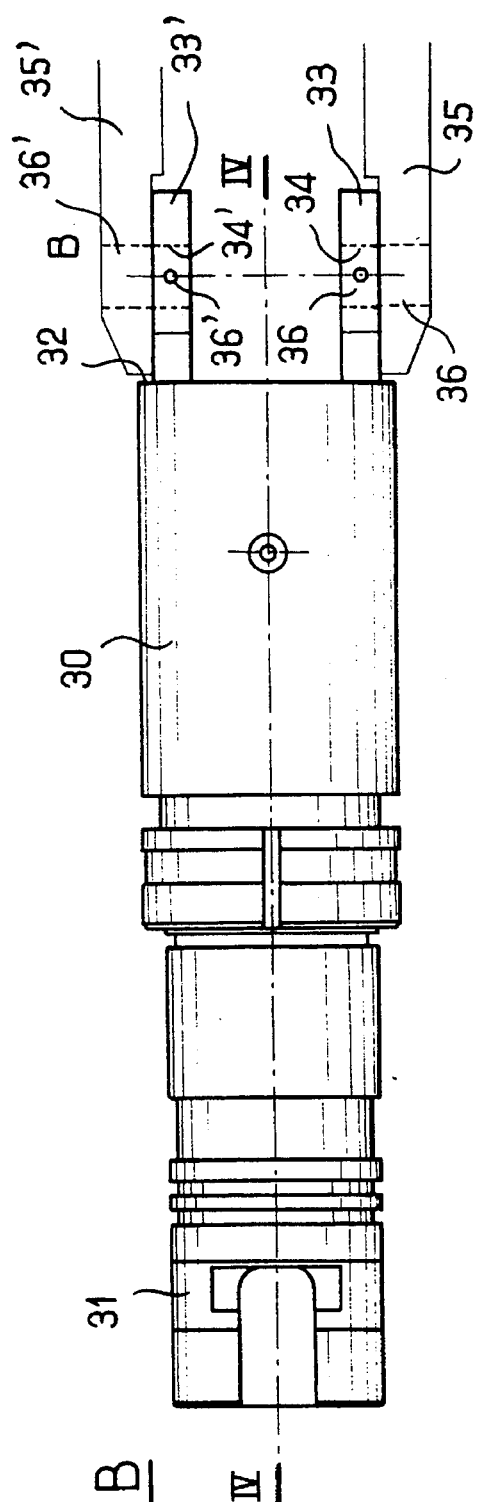
FIG_3B

FIG._4A
FIG._4B
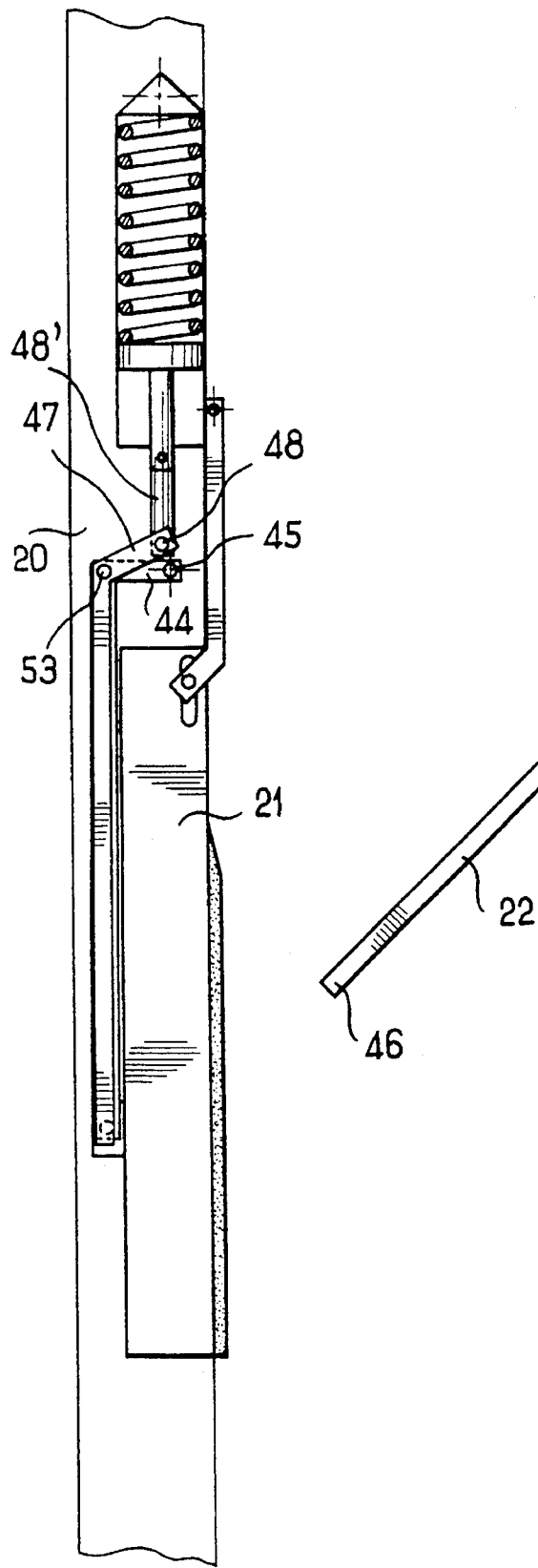
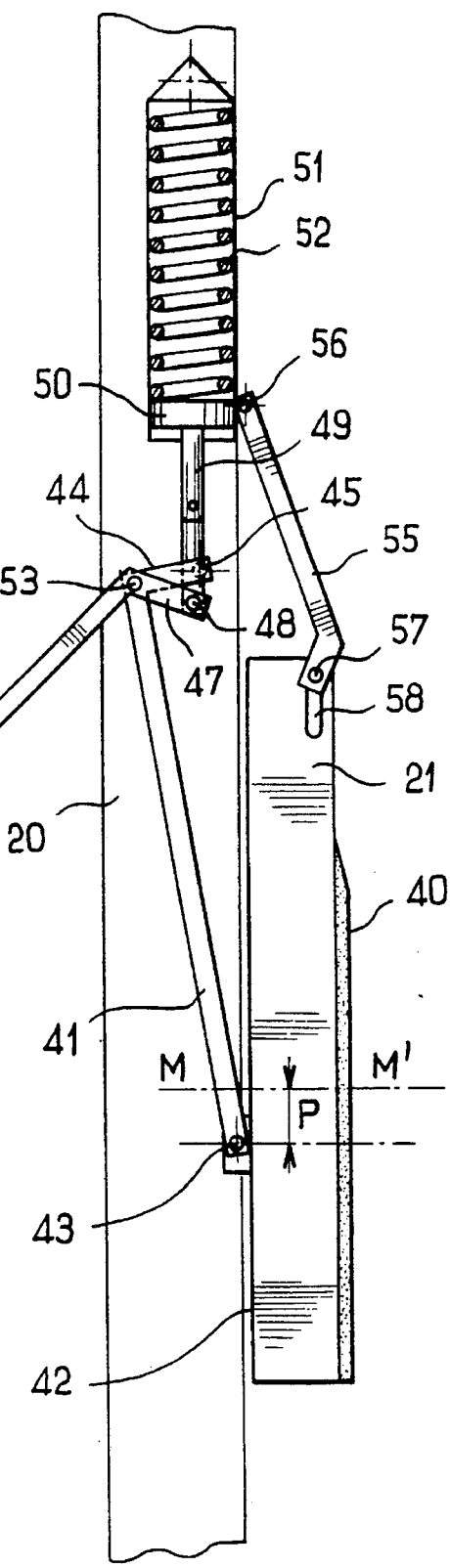

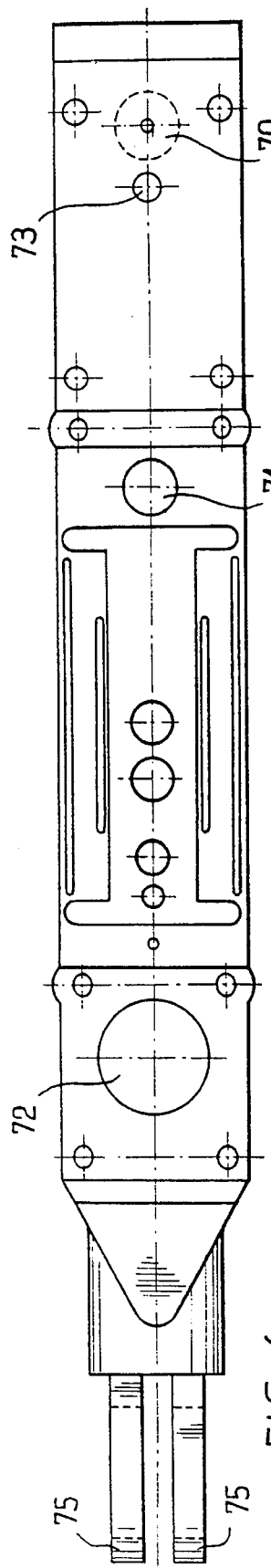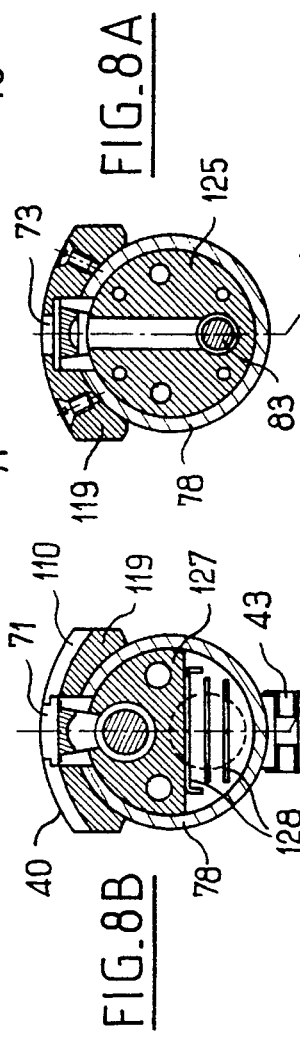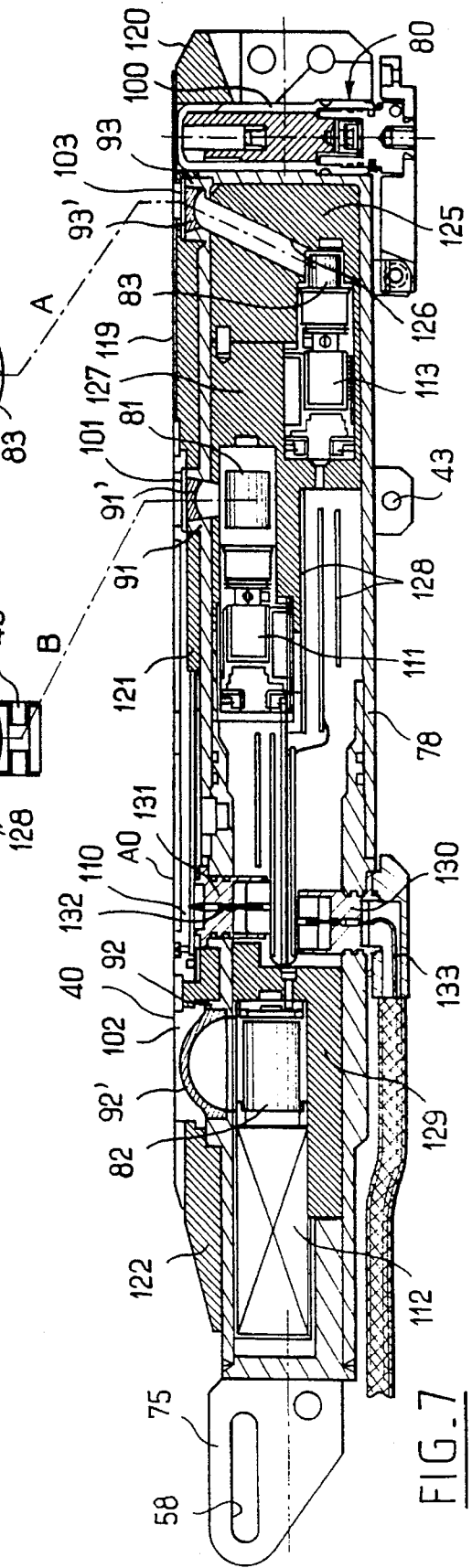
FIG.6   FIG.8A   FIG.8B   FIG.7

WELL LOGGING APPARATUS COMPRISING A MEASURING PAD AND A COMBINATON DEVICE INCLUDING SUCH APPARATUS

This application is a file wrapper continuation of parent application Ser. No. 08/316,267, filed Sep. 30, 1994.

This invention concerns a well logging apparatus adapted to be moved inside a borehole to measure the properties of geological formations, and more particularly to a well logging apparatus comprising a pad adapted to contact the wall of the borehole and carrying sensors. The invention also concerns a combination well logging device including such an apparatus.

In the technique of well logging, apparatuses are conventionally used which comprise a measuring pad adapted to contact the wall of the borehole. This is the case inter alia in density measuring apparatuses such a the LDT tool of Schlumberger. In this type of apparatus, the pad is connected to the body of the apparatus by a coupling mechanism comprising parts hinged to the body in such as way that the pad can space itself radially from the body until it contacts the wall, and means are provided to apply the pad against the wall, these means including a counter-arm pivotally mounted on the side opposite to the pad and adapted to remain applied to the wall.

In techniques of this type, the quality of the measurements requires the pad to be in contact with the wall of the borehole. This objective is difficult to achieve to a greater or lesser extent, depending on the measurement conditions: inclination of the borehole, diameter of the borehole, state of the borehole (for example, presence of "hollows", state of roughness of the wall, etc.), nature of the fluid present in the borehole, speed of displacement of the apparatus, combination with other logging apparatuses.

A conventional type of coupling mechanism, used in the DRS sonde of Schlumberger, is described in U.S. Pat. No. 3,356,146 and more recently in U.S. Pat. No. 5,198,770. This involves a mechanism in form of an actuator whose cylinder is connected to the body by a pivot and whose piston rod is connected to the upper end of the pad, as well as to the end of a counter-arm, and which further comprises a restraining member acting on the lower end of the pad in order to restrict its radial extension. This mechanism does not ensure optimum contact, especially in the presence of "hollows", because of the "effective length" of the pad, which determines its ability to accommodate the irregularities of the wall and which should be as small as possible, is increased by the presence of the coupling actuator, which actuator represents a length of the same order as that of the pad proper. Moreover, since the pad and the counter-arm are closely coupled, significant friction against the counter-arm can provoke disturbances in the pad, in particular a loss of contact with the wall.

Another type of mechanism, described in the U.S. Pat. Nos. 3,654,470, 4,120,353 and 4,432,143, comprises a support arm connected by a pivot to the upper end of the pad and which exercises the tractive force on the pad necessary for its displacement, and a retaining arm connected to the pad by a pivot engaged in an aperture formed in the longitudinal direction.

The mechanisms such as those described above do not give satisfaction because the traction exerted on the pad by the support arm has a tendency to distance the pad from the wall in the presence of "hollows".

U.S. Pat. No. 4,120,353 cited above describes another type of mechanism in which the pad can space itself a limited distance from the body of the apparatus while always remaining parallel thereto. This design also fails to allow the pad to remain in contact with the wall in the presence of "hollows".

An object of the present invention is a well logging apparatus provided with a measuring pad adapted to contact the wall of the borehole and which is better than known devices with regard to contact of the pad with the wall, especially in the presence of "hollows".

According to the invention there is provided a well logging apparatus adapted to be moved inside a borehole, the apparatus comprising an elongate body, a measuring pad adapted to contact the wall of the borehole, a support device for the pad mounted pivotally on one side of the body, and means for applying the pad against the wall of the borehole, characterized in that the support device comprises an arm which carries the weight of the pad and is connected to the pad substantially in the central part thereof.

An embodiment of the invention is described below with reference to the accompanying drawings, in which:

FIG. 1 is a schematic overview of an entire combination logging device constituting an embodiment of the invention, and formed of three sections;

FIG. 2 shows the geometry of the second section of the device of FIG. 1, and more particularly its joints with the other sections;

FIGS. 3A and 3B are detail views of one embodiment of the above-mentioned joints;

FIGS. 4A and 4B are schematic diagrams showing one embodiment of the coupling mechanism for the second section carrying a pad, respectively in the closed position and in the open position;

FIG. 6 is view of the contact face of the measuring pad, in an embodiment that includes two types of sensor that are interleaved;

FIG. 7 shows the pad of FIG. 6 in section on the longitudinal plane VII—VII of FIG. 6; and FIGS. 8A and 8B are sections of the pad of FIG. 7 on the lines A—A and B—B respectively.

Figure 5B:
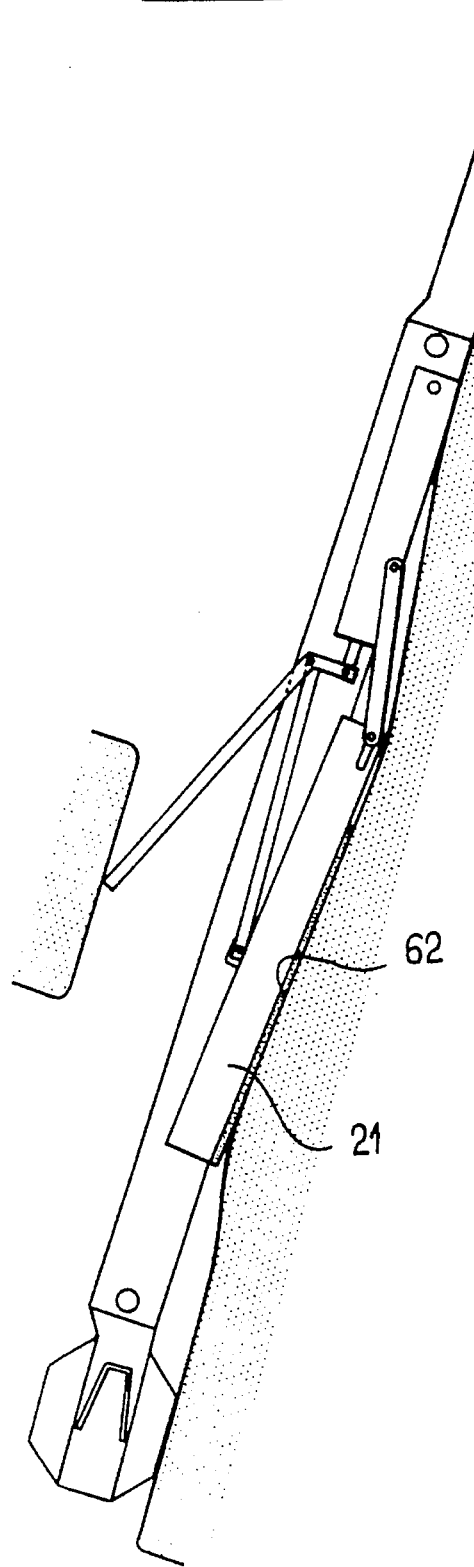
FIGS. 5A and 5B illustrate the behavior of the coupling mechanism of FIGS. 4A and 4B under different operating conditions.

The combination well logging device (or "tool string") shown in FIG. 1 is adapted to be lowered inside a borehole 10 by means of a transmission cable 11. The cable is connected in conventional manner to surface apparatus, not shown, comprising in particular a winch and means for recording and processing the measurement data produced by the logging device and transmitted through the cable.

The device comprises three sections mounted end to end: a first section 15 forming the upper part of the device, connected by a coupling 16 to the cable 11; a second section 17 suspended from the first section 15 and forming an intermediate part; and a third section 18 suspended from the second section and forming the lower part of the device.

The first section is provided with a resilient member 19 in the form of a bow, which bears against the wall of the borehole in its middle part and exerts a force on the first section 15, pressing it against the wall, along a generatrix diametrically opposite the member 19. Such an arrangement is conventional in the case of a neutron logging sonde, which must necessarily be pressed against the wall, in particular in the region of the neutron source, in order to provide correct measurements.

In addition to a neutron logging sonde such as a CNT tool of Schlumberger, the first section may suitably include a sonde for measuring natural gamma radioactivity and a telemetry cartridge forming the interface between the elements of the device and the cable. An inclinometer sonde, such as the GPIT tool of Schlumberger, which comprises accelerometers and magnetometers for all three axes may also be suitably included in this section.

The second section 17 comprises a body forming a cradle 20 carrying a measuring pad 21 adapted to be pressed against the wall, and a counter-arm 22 on the side opposite the pad 21. The measuring pad typically comprises a gamma-gamma device providing a measure of formation density. It can also, as described above, comprise a "microresistivity" device providing a measurement of the resistivity in the rear zone of the wall of the borehole, called the invaded zone.

The second section is connected to the first section 15 by a hinge 23 which allows the second section 17 to be inclined relative to the first section 15. More particularly, in the embodiment shown in FIG. 1 and more clearly in FIG. 2, the second section can pivot relative to the first section about an axis perpendicular to the axis of the first section, in a longitudinal plane containing the abovementioned contact generatrix. This pivoting is allowed solely away from said generatrix. It should also be stressed that the hinge 23 does not allow any twisting between the second section and the first section.

The angular orientation of the body 20 is preferably such that the median longitudinal plane of the pad 21 is aligned with the abovementioned contact generatrix, as shown in FIG. 1.

It is to be noted that the electronics cartridge containing the processing circuits associated with the sensors in the pad 21 can be located in the first section 15, rather than being attached to the body 20 in the second section 17. Such a design has the advantage of reducing the length and the weight of the second section.

The third section 18 comprises one or more spacers 24 (called stand-offs) which keep it spaced from the wall of the borehole. The third section comprises a sonde for measuring resistivity, which can be an electrode sonde of Laterolog type (DLT or ARI tool of Schlumberger), or a sonde with induction coils (DIT or AIT tool of Schlumberger).

The third section is connected to the second section 17 by a hinge 25 allowing these sections to be inclined relative to each other. In the described embodiment, this is a hinge of the same type as the hinge 23, which provides one degree of freedom between the second and third sections. The hinge 25 is so located that it allows pivoting in the same plane as the longitudinal plane defined above for the hinge 23. However, as shown in FIG. 1, the pivoting is allowed only towards the abovementioned generatrix—that is to say towards the pad 21—even though the pivoting is allowed away from the said generatrix in the case of the hinge 23. Moreover, as in the case of the coupling between the first and second sections, the third section cannot twist relative to the second section.

FIG. 2 shows the hinges 23 and 25, symbolized by respective pivots 23a and 25a, with the pivotal angles exaggerated compared with reality.

It is noted that the hinge 23 between the first and second sections has an axis that is offset from the axis I—I of the first section by a distance b, the said axis being located on the side opposite to the contact generatrix 26 of the first section. The maximum pivotal angle allowed by the hinge 23 is an angle α. A suitable value for this angle around 2°.

The hinge 25 has its axis offset relative to the axis III—III of the third section by a distance c, the said axis being located on the same side as the contact generatrix 26 and accordingly on the side opposite to the pivotal axis of the hinge 23. As in this latter case, the desired maximum pivotal angle is around 2°.

The distances b and c are chosen to minimize the risk of loss of contact between the first section and wall of the borehole under the action of the weight of the assembly formed by the second and third sections. For this purpose it is arranged that the center of gravity of the assembly formed by the second and third sections to be no further from the wall than the pivot 23a, or to be closer. Thus, in the embodiment shown, the distance b is selected to be of the same order as the distance c. Typical values are for example a distance b of 22 mm and a distance c of 22 mm.

FIGS. 3A and 3B show one possible implementation of the hinges 23, 25. If the case of the hinge 23 is considered, this comprises a tubular part 30 with an axis IV—IV, comprising an end part 31 adapted to be fixed to the adjacent section, in this case the first section 15. The part 30 has an annular transverse face 32 at the end opposite the part 31 and two parallel, longitudinal clevis plates 33, 33' extending from the face 32. These plates have respective holes 34, 34' with the same transverse axis B, which axis is spaced from the axis IV—IV by a distance b in accordance with the preceding remarks. The part of the hinge which is connected to the second section 17 comprises two clevis plates. 35, 35' associated with the plates 33, 33' respectively and provided with respective pivots 36, 36' engaged in the holes 34, 34'. The plates 35, 35' are shown in FIG. 3B as being located outside the plates 33, 33', but they could equally be located between the plates 33, 33'. Each of the plates 35, 35' has an end surface with two facets which cooperate with the end face 32 of the tubular part 30 in order to allow the limited pivoting, and that solely in one sense, of the second section 17 relative to the first section 15. This surface thus comprises a transverse facet 37 which is accordingly parallel to the end face 32, and an oblique facet 38 meeting the transverse facet at an edge which intersects the axis IV—IV. The oblique facet 38 is located on the side of the pivots 36, as FIG. 3A shows. The angle between the oblique facet and the transverse facet corresponds to the pivotal angle α mentioned above. Moreover, although the transverse facet 37 has been shown for the sake of clarity spaced from the face 32, it should be noted that the transverse facet abuts the face 32, thus preventing any pivoting of the plates 35, 35' in counterclockwise sense (in FIG. 3A). The plates 35, 35' can only pivot clockwise until the oblique facet 38 comes into abutment with the end face 32.

One implementation of the coupling mechanism of the second section 17 including a measuring pad 21 is now described with reference to the schematic views of FIGS. 4A and 4B.

The face of the pad 21 for contacting the wall of the borehole is referenced 40. The pad 21 is supported by an arm 41, one end of which is connected to the rear face 42 of the pad by a hinge 43, which allows pivoting between the pad and the arm 41. The arm 41 is extended at its end remote from the hinge 43 by a bent part or crank 44, whose end is connected to the body 20 by a fixed pivot 45. The counter-arm 22, whose outer end 46 is adapted to contact the wall of the borehole on the side opposite the pad 21, is similarly extended by a bent part or crank 47, whose end is connected by a pivot 48 to the end of a connecting rod 48' pivoted to the end of the rod 49 of a piston 50. This piston is mounted in a cylinder 51 fixed to the body 20 and can be displaced by application of hydraulic pressure overcoming the action of a spring 52, which acts on the pivot 48 in the sense opening out the counter-arm 22. The arm 41 and the counter-arm 22 are connected by a floating pivot 53 located at their junctions with the crank 44 and the crank 47 respectively but not connected to the body 20. This arrangement has the effect that, when the counter-arm 22 comes into contact with the wall of the borehole under the action of the spring 52, as in the position of FIG. 4B, the arm 41 pivots until the pad 21 contacts the wall of the borehole. The piston 50 is actuated to restore the mechanism to the closed position shown in FIG. 4A.

The embodiment shown in FIGS. 4A and 4B also comprises an upper link 55 having its upper end connected to the body 20 by a pivot 56 and having a pivot pin 57 at its lower end engaging in a slot 58 formed in the upper part of the pad 21. The link 55 acts to limit the inclination which the pad 21 can assume relative to the axis of the body 20 but, with the play of the pivot pin 57 along the slot 58, does not exert any significant pull on the pad 21 during the displacement of the body. A similar arrangement, comprising a lower link, can be provided in a symmetrical manner at the lower part of the pad.

It is to be noted that, in this implementation, the pad 21 is supported by the single arm 41 and, as a result, the whole of the force exerted on the pad 21 to move it along the wall of the borehole is transmitted by the pivot 43. This results in particular in the force being applied without giving rise to a couple tending to tilt the pad. As shown in FIGS. 4A and 4B, the pivot 43 is preferably located in the central part of the pad 21 (considered in the longitudinal direction), near to the central plane M-M' of the pad transverse to the axis of the body. The location considered the most advantageous for the pivot 43 is in the lower half of the pad, slightly below the central plane M-M', as is shown in FIGS. 4A and 4B. More specifically, the distance p between the pivot 43 and the central plane M-M' preferably lies between 0% and 15% of the length of the part 40 of the pad which is adapted to make contact with the wall. With such a design, the reaction force of the wall of the borehole on the pad acts in the central zone of the pad, as is desirable for optimum application of the pad against the wall.

Figure 5A:
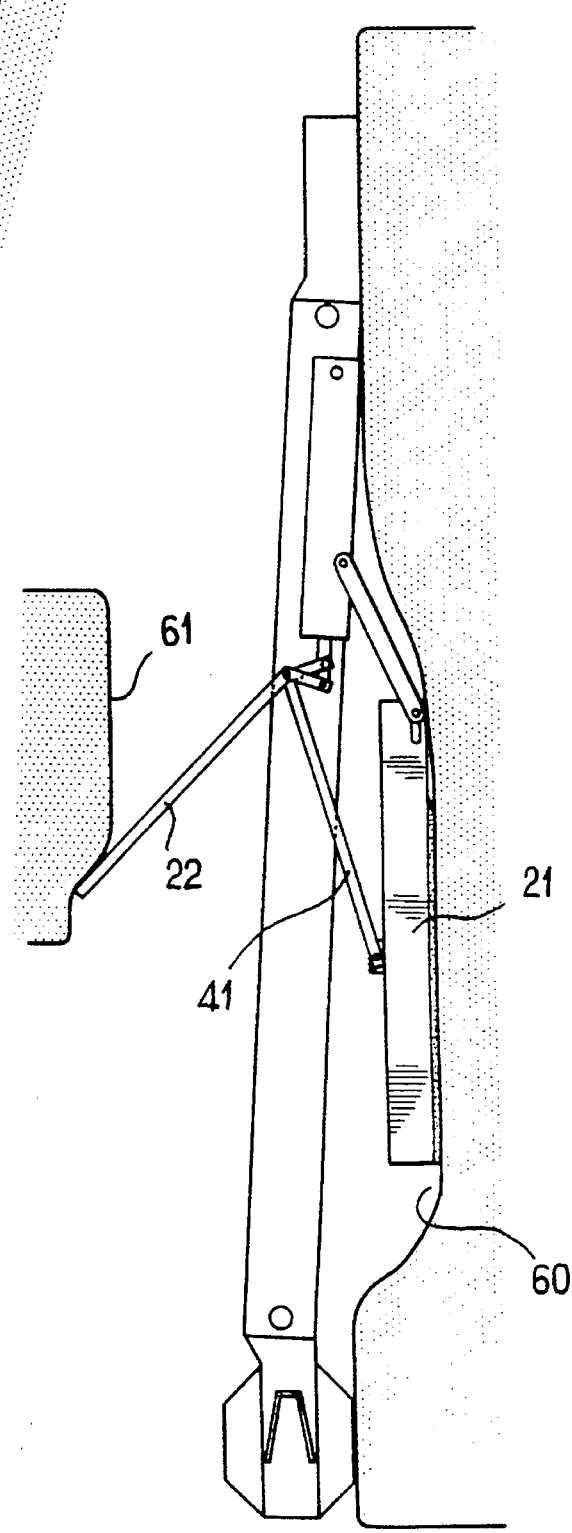

The described implementation ensures satisfactory contact of the pad 21 with the wall of the borehole under diverse working conditions illustrated in FIGS. 5A and 5B.

FIG. 5A illustrates the simultaneous presence of a "hollow" 60, consisting of a cavity formed in the wall of the borehole beside the pad 21, and of a projection or cornice 61 on the opposite side of the wall. FIG. 5A shows that the coupling mechanism described above is able to absorb such abrupt variations in the diameter of the borehole: the respective angular divergences of the counter-arm 22 and of the arm 41 relative to the axis of the body can vary significantly without affecting the force applied to the pad 21 by the arm 41 and, on the other hand, the arrangement of arms connected to the pad 21, namely the arm 41 and the link 55 in the illustrated embodiment, allows the pad 21 to rest against the wall, despite the presence of a hollow, in an optimum manner given the longitudinal dimension of the pad.

FIG. 5B shows an inclined borehole with a ramp 62. The pad 21 is capable of remaining in contact with the wall along this ramp because of the inclination which it can assume relative to the body of the sonde. Equally, the mounting of the body 20 between two hinges, as described above, is a favorable factor which avoids the pad becoming "caked" against the wall by the body 20.

It should be noted that the pivotal connection between the arm 41 and the pad 21 can be implemented in a different way from that described above. Thus a connection could be provided between two lateral pivots located on one side and the other of the pad 21, engaging in a fork extending the arm 41.

A preferred embodiment of the pad 41 will now be described with reference to FIGS. 6, 7 and 8A–8B. As indicated above, it is arranged to combine in a single pad both gamma-gamma transducers or sensors providing a measure of the density of the formations and transducers of different type providing a measure with high vertical resolution of another magnitude, preferably resistivity, in the zone adjoining the wall of the borehole. This combination is realized as shown in FIG. 6 by interleaving members of different types: the gamma-gamma sensors comprise a source of gamma rays and at least one near detector and one far detector, represented in FIG. 6 by the windows 70, 71 and 72 associated with these components respectively; the electrodes A0, A1, M, etc., which make up the device for measuring resistivity are interleaved in the space between the window of the near detector 71 and that of the far detector 72. This design minimizes the length of the contact part 40 of the pad, which is advantageous for good application of the pad against the wall and is equally favorable from the point of view of combining the density measurements with the micro-resistivity measurements respectively provided by these sensors, since errors in the depths attributed to the measurements arising in particular from variations in the instantaneous speed of the pad, are avoided in large measure.

In the embodiment shown in the figures, the gamma-gamma device comprises, apart from the near and far detectors, a backscatter detector located in the immediate vicinity of the source, in accordance with the teaching of U.S. Pat. No. 4,958,073. This detector is characterized by a non-negative response to an increase in the density of the formation, in contrast with the near and far detectors which are attenuation detectors and exhibit a negative response to an increase in the density. The window associated with the backscatter detector is shown at 73 in FIG. 6.

As to the design of the electrodes of the micro-resistivity sensor, this is generally in conformity with the teaching of U.S. Pat. No. 5,036,283, especially FIG. 5 of this patent, or of U.S. Pat. No. 5,198,770 and reference is made to these documents for more information. The design of the electrodes shown comprises firstly a generally I-shaped guard electrode A0 providing passive focusing, and an active focusing system comprising focusing electrodes A1 located on either side of the electrode A0 relative to the longitudinal direction of the pad, and control electrodes M located between the guard electrode A0 and the focusing electrodes A1. The illustrated design also comprises a measuring electrode in the form of a button B0 fitted within the central electrode A0, being insulated therefrom, being centered in its median plane, and being sensitive to the resistivity Rxo of the invaded zone, together with two buttons B1, B2 aligned with the button B0 and of smaller diameter, which provide a measure of resistivity with a smaller depth of investigation, of the type known as Microlog. In addition a button B3 identical with the button B0 is provided in alignment therewith in the longitudinal direction. The buttons B0 and B3, being aligned in the longitudinal direction (i.e. in the direction of movement of the pad) provide two measurements from the same zone of the formation at offset instants, which makes it possible to determine the speed of movement of the pad by correlation. The resulting information is used to determine a depth correction. It is advantageously combined with an indication of the speed obtained from acceleration measurements provided by the above-mentioned inclinometer sonde of the first section, in order to improve the accuracy of the correction, in accordance with a method described in detail in French patent application 93 04229 filed 9, Apr. 1993.

Referring more particularly to FIGS. 8A, 8B, note firstly the face 40 adapted to contact the wall of the borehole and having to this end the shape of a sector of a cylinder. On the opposite side is seen the pivot 43 for making the connection to the support arm, such as the arm 41 shown in FIG. 4B. At its upper end, the pad is extended by two clevis plates 75, each with a slot referenced 58 as in FIG. 4B, for the connection with a link such as the link 55 shown in FIG. 4B.

As its main structural part, the pad comprises a pressure-resistant casing 78 of generally cylindrical shape, made of stainless steel for example. Inside the casing 78 are disposed gamma ray detectors 81, 82, 83, the detectors 81 and 82 "near" and "far" attenuation detectors respectively and the detector 83 being a backscatter detector. In order to allow the gamma rays to reach the detectors, the casing 78 has openings provided with collars 91, 92, 93 on which rest respective domed parts 91', 92', 93' made of a pressure-resistant material with low gamma ray absorption, such as beryllium or titanium. Protective parts 101, 102, 103 of synthetic material of the PEEK type for example are fixed on the domes 91', 92', 93' respectively, these parts forming the windows 71, 72, 73 shown in FIG. 6.

The detectors are appropriately photo-scintillators of GSO type (gadolinium orthosilicate) or NaI. Assemblies 111, 112, 113 respectively are associated with the detectors 81, 82, 83, each being composed of a photo-multiplier, a high voltage supply with its control circuit and a preamplifier circuit.

The gamma ray source, typically a caesium 137 source is a unit 80 located at the lower end of the pad on the outside of the casing 78 and which has its own pressure-resistant envelope 100.

The electrodes A0, M, A1 which form the micro-resistivity sensor are metal parts located in respective recesses formed in a sector of a collar 110 of insulating material, for example PEEK. The detectors 81–83 are screened from unwanted gamma rays (i.e. those which have not interacted with the formation), in particular from direct arrivals, by shields with high gamma ray absorbing power, for example made of material such as tungsten or depleted uranium.

Thus, one shield member 119 with the shape of a sector of a collar is shown in FIGS. 8A, 8B covering the casing 78 in the lower part of the pad, the member 119 having openings which form the windows 70 (for the source), 71 (near detector) and 73 (backscatter detector). This member has an end part 120 which beyond the source 80, thus forming the lower end of the pad, in such a way as to minimize the gamma ray flux towards the borehole fluid. At the opposite end the member 119 is continued by a part 121 extending well beyond the window 71 of the near detector 81, the part 121 being located between the casing 78 and the inside of the sector 110 of insulating material. This arrangement of the shield member minimizes the risk of gamma rays escaping through the insulating material, which has a low absorption to gamma rays. In like manner, a shield member 122 is located on the outside of the casing 78 in the region of the far detector 82 and has an opening forming the window 72.

Shield members of generally cylindrical shape are also provided on the inside of the casing 78. A first inner member 125 surrounds the backscatter detector 83. The member 125 has an oblique hole 126 which ensures collimation of the gamma rays towards the detector 83. A second inner member 127 is fixed to the member 125 and surrounds the near detector 81. The member 127 has the shape of a half-cylinder, as FIG. 7 shows, in its upper part, leaving the lower part of the space inside the casing 78 free, which can thus receive circuit boards or electronics components 128. In like manner, an inner shield member 129 surrounds the far detector 82.

It is also noted that the casing 78 has openings receiving sealed feed-throughs 130, 131 to provide passage for conductors, such as conductors 132 which connect the electrodes (A0, etc.) to circuit boards or components located inside the casing 78 and conductors 133 which connect the boards or associated components to the gamma detectors or to the electrodes on the body of the sonde.

We claim:

1. A well logging apparatus adapted to be moved inside a borehole, the apparatus comprising a tool having an elongate body, a measuring pad adapted to contact the wall of the borehole, a support device for the pad mounted pivotally on one side of the body, the pad braced at the upper end via an upper link connected by a slideable pivot pin in a receiving oval slot, with the support device for the pad further comprising an arm which predominantly carries the full weight of the pad relative to the body by means of a moveable hinge connection or a dual lateral pivot type of fork connection formed with the pad at the lower end of the arm and a fixed pivot connection formed with the body at the upper end of the arm, where the lower end of the arm is connected to the pad substantially in a central part thereof, and wherein the support device also comprises means for applying the pad against the wall of the borehole while the tool is moved inside the borehole to permit reliable real time, continuous measurements of borehole properties during movement of the apparatus and tool through the borehole.

2. An apparatus according to claim 1, wherein said arm is connected to the pad in a region located in the lower half thereof.

3. An apparatus according to claim 1, wherein said arm is connected to the pad by a pivotal joint.

4. An apparatus according to claim 1, wherein said arm is connected to the pad on the face thereof opposite the contact face.

5. An apparatus according to claim 1, wherein the support device further comprises a pivotal link connected to the upper part of the pad and arranged to limit the inclination of the pad relative to the axis of the body.

6. An apparatus according to claim 5, wherein said pivotal link has a length such that the pad remains applied against the wall of the borehole when the borehole has a hollow.

7. An apparatus according to claim 5, wherein the pivotal link has a member engaging in a slot formed in the upper part of the pad.

8. An apparatus according to claim 6, wherein the pivotal link has a member engaging in a slot formed in the upper part of the pad.

9. A combination well logging device comprising first, second and third sections mounted end to end in an initial substantially vertical manner, the second section being connected to the first and third sections by respective hinges allowing the second section to assume an angle of inclination relative to the initial substantially vertical orientation of the first and second sections, the second section comprising apparatus having an elongate body, a measuring pad adapted to contact the wall of the borehole, a support device for the pad mounted pivotally on one side of the body comprising an arm which carries the weight of the pad and is connected to the pad substantially in a central part thereof, and means for applying the pad against the wall of the borehole while the tool is moved inside the borehole to permit reliable real time, continuous measurements of borehole properties during movement of the device through the borehole.

10. A device according to claim 9, wherein said inclination angle is restrained to be within a certain specified maximum range of allowed swing on a predetermined longitudinal plane related to an adjacent section.

11. A device according to claim 9, wherein said arm is connected to the pad in a region located in the lower half thereof.

12. A device according to claim 9, wherein said arm is connected to the pad by a pivotal joint.

13. A device according to claim 9, wherein said arm is connected to the pad on the face thereof opposite the contact face.

14. A device according to claim 9, wherein the support device further comprises a pivotal link connected to the upper part of the pad and arranged to limit the inclination of the pad relative to the axis of the body.

15. A device according to claim 9, wherein said pivotal link has a length such that the pad remains applied against the wall of the borehole when the borehole has a hollow.

16. An apparatus according to claim 9, wherein the pivotal link has a member engaging in a slot formed in the upper part of the pad.

17. An apparatus according to claim 9, wherein the pivotal link has a member engaging in a slot formed in the upper part of the pad.

18. A device according to claim 9, wherein said inclination angle is restrained to be within and swing within a predetermined longitudinal plane related to an adjacent section.

19. A device according to claim 9, wherein the first section is adapted to be applied against the wall of the borehole, while the third section is adapted to remain spaced apart along its full length from said wall.

20. A device according to claim 18, wherein the first section is adapted to be applied against the wall of the borehole, while the third section is adapted to remain spaced apart along its full length from said wall.

* * * * *